(12) United States Patent
Han et al.

(10) Patent No.: US 10,275,072 B2
(45) Date of Patent: Apr. 30, 2019

(54) TOUCH CONTROL STRUCTURE, DISPLAY PANEL AND TOUCH CONTROL METHOD

(71) Applicant: BOE TECHNOLOGY GROUP CO., LTD., Beijing (CN)

(72) Inventors: Yanling Han, Beijing (CN); Xuefei Wang, Beijing (CN); Chunfang Zhang, Beijing (CN); Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 127 days.

(21) Appl. No.: 15/228,834

(22) Filed: Aug. 4, 2016

(65) Prior Publication Data

US 2017/0277334 A1 Sep. 28, 2017

(30) Foreign Application Priority Data

Mar. 25, 2016 (CN) .......................... 2016 1 0177410

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01); *G06F 2203/04105* (2013.01)

(58) Field of Classification Search
CPC ........... G06F 3/044; G06F 2203/04105; G06F 3/0412; G06F 3/0416
See application file for complete search history.

(56) References Cited

U.S. PATENT DOCUMENTS

| 2008/0202251 A1* | 8/2008 | Serban ................... G01L 1/142 73/780 |
| 2010/0107770 A1 | 5/2010 | Serban et al. |
| 2012/0299868 A1* | 11/2012 | Bhagavat ................ G06F 3/044 345/174 |

(Continued)

FOREIGN PATENT DOCUMENTS

| CN | 101458581 A | 6/2009 |
| CN | 102866813 A | 1/2013 |

(Continued)

OTHER PUBLICATIONS

China First Office Action, Application No. 201610177410.2, dated Apr. 3, 2018, 16 pps.: with English translation.

*Primary Examiner* — Lixi C Simpson
(74) *Attorney, Agent, or Firm* — Armstrong Teasdale LLP

(57) ABSTRACT

The present disclosure discloses a touch control structure, a display panel and a touch control method. The touch control structure comprises a first conductive layer, a second conductive layer, a plurality of insulative supporting points, and a detection module. The second conductive layer comprises a plurality of electrodes which are independent from each other. The plurality of insulative supporting points is arranged on the first conductive layer and under the second conductive layer. The detection module is connected to the plurality of electrodes, and configured to detect an electrode in the second conductive layer contacted with the first conductive layer when the first conductive layer is pressed, and to determine a level of pressure pressed on the first conductive layer.

14 Claims, 3 Drawing Sheets

(56) References Cited

U.S. PATENT DOCUMENTS

| | | | |
|---|---|---|---|
| 2013/0009653 A1* | 1/2013 | Fukushima | G06F 3/044 324/679 |
| 2015/0049064 A1* | 2/2015 | Shin | G06F 3/0418 345/178 |
| 2015/0301660 A1* | 10/2015 | Watazu | G06F 3/045 345/173 |
| 2016/0239125 A1* | 8/2016 | Tsutsumi | G06F 3/044 |
| 2016/0282999 A1* | 9/2016 | Hwang | G06F 3/044 |
| 2017/0003782 A1* | 1/2017 | Heo | G06F 3/044 |
| 2017/0192582 A1* | 7/2017 | Pan | G06F 3/0416 |

FOREIGN PATENT DOCUMENTS

| | | |
|---|---|---|
| CN | 105426013 A | 3/2016 |
| JP | 2010079791 A | 4/2010 |

* cited by examiner

TOUCH CONTROL STRUCTURE, DISPLAY PANEL AND TOUCH CONTROL METHOD

CROSS REFERENCE TO RELATED APPLICATIONS

This application claims the benefit and priority of Chinese Patent Application No. 201610177410.2, filed on Mar. 25, 2016, the entire content of which is incorporated by reference herein.

BACKGROUND

The present disclosure relates to display technology, and more particularly, to a touch control structure, a display panel and a touch control method.

With the development of the manufacturing technologies of a display device, the display device, such as mobile terminal, has developed from small screen with multiple keys into large screen with fewer keys. User may slide his/her finger on the screen of the display device instead of pressing a key, which may increase the user experience greatly.

The existing display device usually comprises a touch line in which an electrical signal exists. The electrical signal will be affected and changed if the user touches or swipes on the display panel of the display device with his/her finger. The touched or swiped position by the user may be computed based on a change of the electrical signal, and the display device may be controlled to implement functions. For example, when the user touches an application's icon displayed on the display panel, the application will be started. For another example, when the user swipes on the display panel with his/her finger, the display interface of the display panel may be changed.

However, the existing display device implements the functions of the display device by detecting a touch or swipe on the display panel only, and thus the operation method of the display device is limited.

BRIEF DESCRIPTION

According to an aspect of the present disclosure, there is provided a touch control structure. The touch control structure comprises a first conductive layer, a second conductive layer, a plurality of insulative supporting points, and a detection module. The second conductive layer comprises a plurality of electrodes which are independent from each other. The plurality of insulative supporting points is arranged on the first conductive layer and under the second conductive layer. The detection module is connected to the plurality of electrodes, and is configured to detect an electrode in the second conductive layer contacted with the first conductive layer when the first conductive layer is pressed, and to determine a level of pressure pressed on the first conductive layer.

In an embodiment of the present disclosure, the plurality of insulative supporting points is uniformly arranged between the first conductive layer and the second conductive layer.

In an embodiment of the present disclosure, the insulative supporting point is an elastic supporting point.

In an embodiment of the present disclosure, the first conductive layer has a continuous surface.

In an embodiment of the present disclosure, the detection module is further configured to determine an amount of the electrode in the second conductive layer contacted with the first conductive layer, and to determine the level of pressure based on the amount.

In an embodiment of the present disclosure, the detection module is further configured to count an amount of the electrode in the second conductive layer contacted with the first conductive layer, and to compute a difference between the last counted amount and the first counted amount in response to the counted amount becoming steady, and to determine the level of pressure based on the difference.

In an embodiment of the present disclosure, the detection module is further configured to measure a total current flowing through the electrode in the second conductive layer contacted with the first conductive layer, to compute a difference between the last total current and the first total current in response to the total current becoming steady, and to determine the level of pressure based on the difference.

In an embodiment of the present disclosure, the detection module is further configured to supply a first voltage to the plurality of electrodes in the second conductive layer. The first conductive layer is connected to a common voltage end or is grounded.

In an embodiment of the present disclosure, each of the plurality of electrodes is square, and wherein a side length of the square is equal to or less than 1 mm.

In an embodiment of the present disclosure, the touch control structure further comprises a protection layer and a glass substrate. The protection layer is layered on the first conductive layer. The second conductive layer is arranged on the glass substrate.

In an embodiment of the present disclosure, the detection module is a detection integrated circuit.

According to another aspect of the present disclosure, there is provided a display panel. The display panel comprises the touch control structure as described above.

According to still another aspect of the present disclosure, there is provided a touch control method for the touch control structure as described above. In the touch control method, when the first conductive layer is pressed, an electrode in the second conductive layer contacted with the first conductive layer is detected. Then a level of pressure pressed on the first conductive layer is determined based on the detected at least one electrode.

In an embodiment of the present disclosure, an amount of the electrode in the second conductive layer contacted with the first conductive layer is determined, and the level of pressure pressed on the first conductive layer is determined based on the amount.

In an embodiment of the present disclosure, an amount of the electrode in the second conductive layer contacted with the first conductive layer is counted. A difference between the last counted amount and the first counted amount is computed in response to the counted amount becoming steady. Then the level of pressure pressed on the first conductive layer is determined based on the difference.

In an embodiment of the present disclosure, a total current flowing though the electrode in the second conductive layer contacted with the first conductive layer is measured. A difference between the last total current and the first total current is computed in response to the total current becoming steady. Then the level of pressure pressed on the first conductive layer is determined based on the difference.

BRIEF DESCRIPTION OF THE DRAWINGS

The present disclosure will become more apparent from the following disclosure and claims. The following nonrestrictive description of specific embodiments is given for the purpose of exemplification only with reference to the accompanying drawing, wherein:

DETAILED DESCRIPTION

To facilitate better understanding of the present disclosure, embodiments of the present disclosure will be described in detail in conjunction with the drawings. While certain embodiments have been described, these embodiments have been presented by way of examples only, and are not intended to limit the scope of the disclosure. Indeed, the embodiments described herein may be embodied in a variety of other forms; furthermore, various omissions, substitutions and changes in the form of the embodiments described herein may be made without departing from the spirit of the disclosure.

Figure 1:
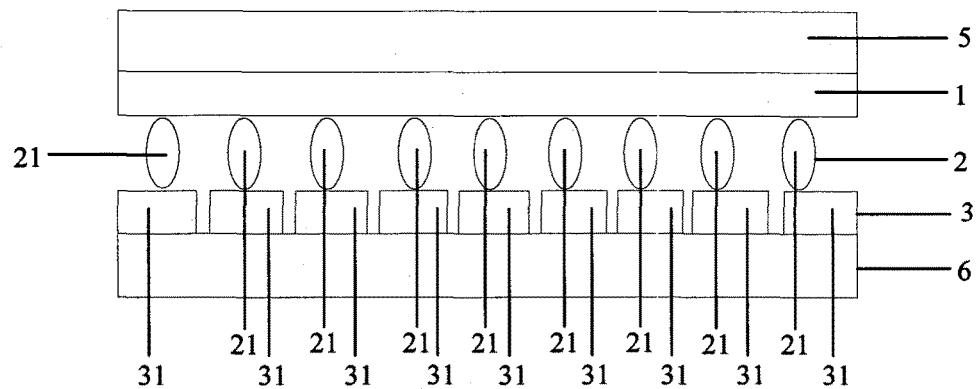
FIG. 1 is a cross section view of the touch control structure according to an embodiment of the present disclosure.
Figure 2:
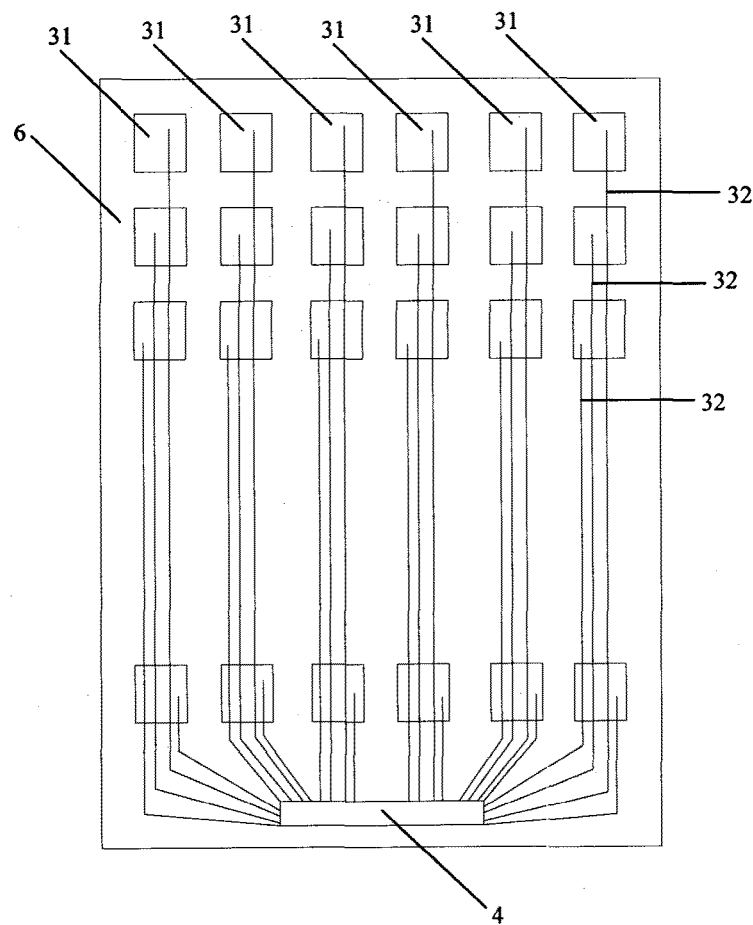
FIG. 2 is a top view of the second conductive layer and the glass substrate of the touch control structure according to an embodiment of the present disclosure.

As shown in FIGS. 1 and 2, the touch control structure according to an embodiment of the present disclosure comprises a first conductive layer 1, a plurality of insulative supporting points 2, a second conductive layer 3, and a detection module 4. The plurality of insulative supporting points 2 is arranged on the first conductive layer 1 and under the second conductive layer 3.

The second conductive layer 3 may comprise a plurality of electrodes 31 which are independent from each other. These electrodes 31 are electrically isolated from each other. It should be noted that an amount of the electrodes 31 in FIG. 2 is illustrative, but not limited. The detection module 4 may be connected to the plurality of electrodes 31 in the second conductive layer 3 via a plurality of leads 32.

When there is a voltage difference between the first conductive layer 1 and the second conductive layer 3, the detection module 4 may detect the electrode(s) 31 in the second conductive layer 3 contacted with the first conductive layer 1 when the first conductive layer 1 is pressed, and may further determine a level of pressure pressed on the first conductive layer.

In the case that there is no pressure pressed on the touch control structure, the insulative supporting points 2 may isolate the first conductive layer 1 from the second conductive layer 3. At this time, the first conductive layer 1 does not contact with any electrode 31 in the second conductive layer 3. The first conductive layer 1 may be deformed when it is pressed. The pressed area of the first conductive layer 1 is contacted with the electrode(s) 31 in the second conductive layer 3. Accordingly, the electrode(s) 31 is contacted and electrically connected with the first conductive layer 1. The detection module 4 may detect the contacted electrode(s) 31 and determine the level of pressure pressed on the first conductive layer 1.

Further, the detection module 4 may determine the position where the first conductive layer 1 is pressed based on the position(s) of the contacted electrode(s) 31. In an embodiment of the present disclosure, each of the electrodes 31 in the second conductive layer 3 may be assigned with a position. Thus the detection module 4 may determine the pressed position based on the position(s) of the contacted electrode(s) 31.

Further, in the case that the first conductive layer 1 is pressed at multiple positions, multiple pressed areas of the first conductive layer 1 may contacted with multiple electrodes 31 in the second conductive layer 3, respectively, and these electrodes 31 are contacted and electrically connected with the first conductive layer 1. The detection module 4 may detect these contacted electrodes 31 and determine the levels of pressure pressed on these areas and the pressed positions, respectively. In this way, the multi-touch control may be implemented.

As described above, the touch control structure shown in FIG. 1 and FIG. 2 can determine the position and the level of pressure pressed on the first conductive layer. Thus, the display device provided with the touch control structure can implement the touch control based on the determined position and the level of pressure.

In an embodiment of the present disclosure, the touch control structure may be arranged on a display screen of a display device, for example, at the upper layer or lower layer of the display screen. The display screen may display many application icons representing an application, and each of the application icons is assigned with a position of the display screen. In the case that the display screen is pressed, the touch control structure may determine the pressed position and the corresponding level of pressure. Then the display device may determine the application icon corresponding to the pressed position. Based on the application represented by the determined application icon and the determined level of pressure, a particular function may be determined according to a predefined relationship between the function, the application, and the level of pressure. Then the display device may perform the determined function.

In a prior art display device, the user usually changes the user interface of the display device by swiping on the user interface with his/her finger, or touches an application's icon to start the application so as to perform a certain function. For example, an application A has a function "Scan QR Code", and the user wants to use this function. In this case, the user touches the application icon representing the application A to enter an operation interface of the application A. Then the user may touch a symbol representing a pull-down menu to show the pull-down menu. The menu may include some options such as "Scan QR Code", "Initiate group chat", and "Find Friends", etc. Then the user may touch "Scan QR Code" to use the function "Scan QR Code". It can be seen that the user should enter the operation interface of the application A to select the desired function. Thus, the existing operation method of the display device is limited and cumbersome.

However in the display device provided with the touch control structure according to the embodiment of the present disclosure, the user may press the first conductive layer 1 of the touch control structure to contact with a part of the electrodes 31 in the second conductive layer 3. The detection module 4 may detect the contacted electrodes 31 in the second conductive layer 3, which are contacted and electrically connected with the first conductive layer 1, and may determine the pressed position and the level of pressure. Based on the determined position and the level of pressure, the application corresponding to the determined position may be controlled to perform a certain function. For example, the application A may be configured with three levels of pressure: first level, second level and third level. Function options corresponding to the first level may include "Scan QR Code", "Initiate Group Chat", and "Find Friends". Function options corresponding to the second level may include "Contacts", "Discovery", and "Shaking". Function options corresponding to the third level may include "Drift Bottle", "Shopping", and "Play". When the user presses the application icon of the application A on the display screen, the area corresponding to the application icon in the first conductive layer is contacted with the electrode(s) 31 in the second conductive layer. Then the level of pressure may be determined based on the contacted electrode(s) 31. If the determined level of pressure is the first level, a popup menu comprising the function options "Scan QR Code", "Initiate Group Chat", and "Find Friends" may be shown near the application icon of the application A. Then the user may select the desired function. If the determined level of pressure is the second level, a popup menu comprising the function options "Contacts", "Discovery", and "Shaking" may be shown near the application icon of the application A. Then the user may select the desired function. If the determined level of pressure is the third level, a popup menu comprising the function options "Drift Bottle", "Shopping", and "Play" may be shown near the application icon of the application A. Then the user may select the desired function. It can be seen that the display device provided with the touch control structure according to the embodiment of the present disclosure can provide an easy and quick operation method, and the operation is simple and convenient.

Further, the display device provided with the touch control structure according to the embodiment of the present disclosure can implement the multi-touch control. In the case that the user presses the display screen of the display device at multiple positions, the multiple pressed areas of the first conductive layer 1 are contacted with the electrodes 31 in the second conductive layer 3 respectively. The pressed positions and the corresponding levels of pressure may be determined based on the contacted electrodes 31, and the corresponding function to perform may further be determined.

In some embodiments of the present disclosure, the touch control structure may further comprise a protection layer, as shown in FIG. 1. The protection layer 5 may be layered on the first conductive layer 1 to protect it. If the touch control structure is arranged at the upper layer of the display screen, the protection layer 5 may also function as a glass layer to protect the first conductive layer 1 from being frayed or scratched. In an embodiment of the present disclosure, the protection layer 5 may be made of plastic.

In some embodiments of the present disclosure, the touch control structure may further comprise a glass substrate 6, as shown in FIG. 1. The second conductive layer 3 may be arranged on the glass substrate 6. In the process of manufacturing the touch control structure, the glass substrate 6 may be used as a substrate, and the second conductive layer 3, the insulative supporting points 2 and the first conductive layer 1 may be formed on the glass substrate 6 in sequence.

Further, in an embodiment of the present disclosure, each of the plurality of electrodes 31 in the second conductive layer 3 is square, and the side length of the square is equal to or less than 1 mm, as shown in FIG. 2. In addition, the electrode 31 may also be circular, triangular, rectangular or any other shape. The size of the electrode 31 may also be designed as needed.

Further, in an embodiment of the present disclosure, each of the plurality of electrodes 31 in the second conductive layer 3 may be electrically connected to the detection module 4 via a lead 32, as shown in FIG. 2. The leads 32 may be formed together with the electrodes 31 through a mask exposure process.

In an embodiment of the present disclosure, the first conductive layer 1 may have a continuous surface. Further, the first conductive layer 1 may be connected to a common voltage end or may be grounded. The detection module 4 may supply a first voltage to the plurality of electrodes 31 in the second conductive layer 3, and there is a voltage difference between the first voltage and the voltage provided by the common voltage end or between the first voltage and the ground. Thus there is the voltage difference between the first conductive layer 1 and the second conductive layer 3.

In the case that there is the voltage difference between the first conductive layer 1 and the second conductive layer 3, when the first conductive layer 1 is contacted with the electrode(s) 31 in the second conductive layer 3, electrical currents may be generated at the contacted electrode(s) 31. The detection module 4 may detect the contacted electrode(s) 31 by detecting the electrode(s) 31 at which the current is generated. The electrodes 31 that are not generating the current are the electrodes that are not contacted with the first conductive layer 1.

In an embodiment of the present disclosure, the detection module 4 may be a detection integrated circuit (IC).

In an embodiment of the present disclosure, the plurality of insulative supporting points 2 may be uniformly arranged between the first conductive layer 1 and the second conductive layer 3, as shown in FIG. 1. Further, the insulative supporting point 2 may be an elastic supporting point 21.

With the elastic supporting point 21, it can be ensured that the pressed area of the first conductive layer 1 is contacted with the second conductive layer 3, such that a part of the electrodes 31 in the second conductive layer 3 are contacted with the first conductive layer 1. In addition, the uniform arrangement of the insulative supporting points 2 between the first conductive layer 1 and the second conductive layer 3 can prevent the first conductive layer 1 from being contacted with the second conductive layer 3 in the case that there is no pressure pressed on the first conductive layer 1.

In an embodiment of the present disclosure, the material of the insulative supporting point 2 may be an organic resin. In this case, the insulative supporting point 2 may be formed between the first conductive layer 1 and the second conductive layer 3 by means of instillation.

In an embodiment of the present disclosure, the detection module 4 may determine an amount of the electrode(s) 31 in the second conductive layer 3 contacted with the first conductive layer 1 when the first conductive layer 1 is pressed. Then the detection module 4 may determine the level of pressure pressed on the first conductive layer 1 based on the amount of the determined electrode(s) 31. For example, a correspondence relationship between the level of pressure and an amount range of the contacted electrode 31 may be predetermined. As such, the detection module 4 may determine the level of pressure based on the amount range within which the determined amount of the contacted electrode(s) 31 falls.

In an embodiment of the present disclosure, the detection module 4 may count an amount of the electrode(s) 31 in the second conductive layer 3 contacted with the first conductive layer 1, and may store the first counted amount. Then when the counted amount no longer changes, i.e. when the counted amount becomes steady, the detection module 4 may compute a difference between the last counted amount and the first counted amount and determine the level of pressure based on the difference.

When the first conductive layer 1 is pressed and contacted with the second conductive layer 3, one or more electrodes 31 in the second conductive layer 3 are contacted and electrically connected with the first conductive layer 1. The detection module 4 may count the amount of the contacted electrode(s) 31 to obtain the first counted amount. Then the detection module 4 may store the first counted amount. As the pressure pressed on the first conductive layer 1 is increased, the amount of the contacted electrodes 31 is increased, and the counted amount is increased. When the pressure is no longer increased, the amount of the contacted electrodes 31 is no longer increased. At this time, the counted amount no longer changes. Then the detection module 4 may compute the difference between the last counted amount and the first counted amount. Then the detection module 4 may determine the level of pressure based on the difference.

In an embodiment of the present disclosure, a correspondence relationship between the level of pressure and a difference range of the counted amount may be predetermined. As such, the detection module 4 may determine the level of pressure based on the difference range within which the difference falls.

In the above example in which the application A is configured with three pressure levels: the first level, the second level and the third level, assume that the difference range of the counted amount corresponding to the first level is 1-10, the difference range of the counted amount corresponding to the second level is 11-20, and the difference range of the counted amount corresponding to the third level is 21-30. If the computed difference falls within the range of 1-10, the level of pressure is determined as the first level. At this time, the popup menu comprising the function options "Scan QR Code", "Initiate Group Chat", and "Find Friends" is shown near the application icon of the application A. If the computed difference falls within the range of 11-20, the level of pressure is determined as the second level. At this time, the popup menu comprising the function options "Contacts", "Discovery", and "Shaking" is shown near the application icon of the application A. If the computed difference falls within the range of 21-30, the level of pressure is determined as the third level. At this time, the popup menu comprising the function options "Drift Bottle", "Shopping", and "Play" is shown near the application icon of the application A.

As different users may have different size of fingers, the amount of the contacted electrodes 31 caused by the pressing of the user with larger fingers is greater than the amount of the contacted electrodes 31 caused by the pressing of the user with smaller fingers. Thus the level of pressure can be determined more accurately using the difference between the maximum amount of the contacted electrodes 31 and the initial amount of the contacted electrodes 31 at the beginning of the pressing, regardless of the size of the user's fingers.

In an embodiment of the present disclosure, the detection module 4 may also determine the level of pressure in real time based on the difference between the real time counted amount P of the contacted electrodes 31 and the first counted amount N of the contacted electrodes 31 which is obtained at the beginning of the pressing.

For example, for the application A, the detection module 4 may obtain the amount P of the contacted electrodes 31 in the second conductive layer 3 in real time, and may compute the difference between the amount P and the first counted amount N obtained at the beginning of the pressing. If this difference corresponds to the first level, the popup menu corresponding to the first level may be shown near the application icon of the application A. The user may determine whether the function options included in the popup menu contains the desired function. If not, the user may increase the pressure pressed on the first conductive layer 1, and the difference is increased. If this difference corresponds to the second level, the popup menu corresponding to the second level may be shown at the same position. The user may determine whether the function options included in the popup menu contain the desired function. If so, the user may stop the pressing and select the desired function. If not, the user may increase the pressure pressed on the first conductive layer 1 until he/she finds the desired function.

In an embodiment of the present disclosure, the detection module 4 may also measure a total current flowing though the electrode(s) 31 in the second conductive layer 3 contacted with the first conductive layer 1. The detection module 4 may store the first total current. When the total current no longer changes, i.e. when the total current becomes steady, the detection module 4 may compute the difference between the last total current and the first total current. Then the detection module 4 may determine the level of pressure based on the computed difference of the total current.

When the first conductive layer 1 is pressed and contacted with the second conductive layer 3, one or more electrodes 31 in the second conductive layer 3 are contacted and electrically connected with the first conductive layer 1. As the contacted electrode(s) 31 may generate the current(s), the detection module 4 may measure the total current flowing though the contacted electrode(s) 31, and store the measured value as the first total current. As the pressure pressed on the first conductive layer 1 is increased, the amount of the contacted electrodes 31 is increased, and the detection module 4 may measure the total current continuously. When the pressure is no longer increased, the measured total current is no longer increased. Then the detection module 4 may compute the difference between the last total current and the stored first total current, and determine the level of pressure based on the difference.

In an embodiment of the present disclosure, a correspondence relationship between the level of pressure and a difference range of the total current may be predetermined. As such, the detection module 4 may determine the level of pressure based on the difference range within which the difference falls.

In an embodiment of the present disclosure, the detection module 4 may also determine the level of pressure in real time based on the difference between the real-time measured total current and the first total current measured at the beginning of the pressing.

In an embodiment of the present disclosure, there is also provided a display panel which comprises the touch control structure as described above. The display panel may also comprise a touch line. With the touch line, the touch or swiping on the display panel may be recognized. In addition, with the touch control structure, the position and the level of pressure pressed on the display panel may be determined, and the corresponding function may be performed. The touch line and the touch control structure may operate independently.

As described above, in the case that there is no pressure pressed on the touch control structure according to the embodiments of the present disclosure, the plurality of insulative supporting points 2 may isolate the first conductive layer 1 from the second conductive layer 3. At this time, the first conductive layer 1 does not contact with any electrode 31 in the second conductive layer 3. The first conductive layer 1 may be deformed when it is pressed. The pressed area of the first conductive layer 1 is contacted with one or more electrodes 31 in the second conductive layer 3. Accordingly, the electrode(s) 31 is contacted and electrically connected with the first conductive layer 1. The detection module 4 may detect the contacted electrode(s) 31 and determine the level of pressure pressed on the first conductive layer 1. Further, the detection module 4 may determine the position of pressure based on the position(s) of the contacted electrode(s) 31.

Further, in the case that the first conductive layer 1 is pressed at multiple positions, multiple pressed areas of the first conductive layer 1 are contacted with multiple electrodes 31 in the second conductive layer 3, respectively, and these electrodes 31 are contacted and electrically connected with the first conductive layer 1. The detection module 4 may detect these contacted electrodes 31 and determine the levels of pressure pressed on these areas and the pressed positions, respectively. In this way, the multi-touch control may be implemented.

Figure 3:
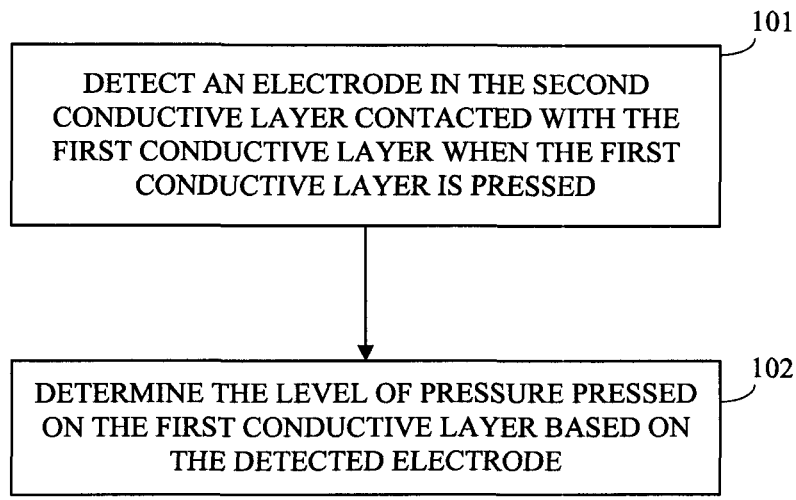
FIG. 3 is a flow diagram of the touch control method according to an embodiment of the present disclosure.

FIG. 3 is a flow diagram of the touch control method according to an embodiment of the present disclosure. The touch control method may be used for the touch control structure as shown in FIGS. 1 and 2. As shown in FIG. 3, in step 101, the touch control structure may detect one or more electrodes 31 in the second conductive layer 3 contacted with the first conductive layer 1 when the first conductive layer 1 is pressed. At this time, there is the voltage difference between the first conductive layer 1 and the second conductive layer 3. Then, in step 102, the touch control structure may determine the level of pressure pressed on the first conductive layer 1 based on the detected electrode(s) 31.

In an embodiment of the present disclosure, the first conductive layer 1 may be deformed when it is pressed. The pressed area of the first conductive layer 1 is contacted with the electrode(s) 31 in the second conductive layer 3. Accordingly, the electrode(s) 31 is contacted and electrically connected with the first conductive layer 1. The detection module 4 may detect the contacted electrode(s) 31 and determine the level of pressure pressed on the first conductive layer 1. Further, the detection module 4 may determine the position of the pressure based on the position(s) of the contacted electrode(s) 31.

Further, in the case that the first conductive layer 1 is pressed at multiple positions, the multiple pressed areas of the first conductive layer 1 are contacted with multiple electrodes 31 in the second conductive layer 3, respectively, and these electrodes 31 are contacted and electrically connected with the first conductive layer 1. The detection module 4 may detect the contacted electrodes 31 and determine the levels of pressure pressed on these areas and the pressed positions, respectively. In this way, the multi-touch control may be implemented.

Figure 4:
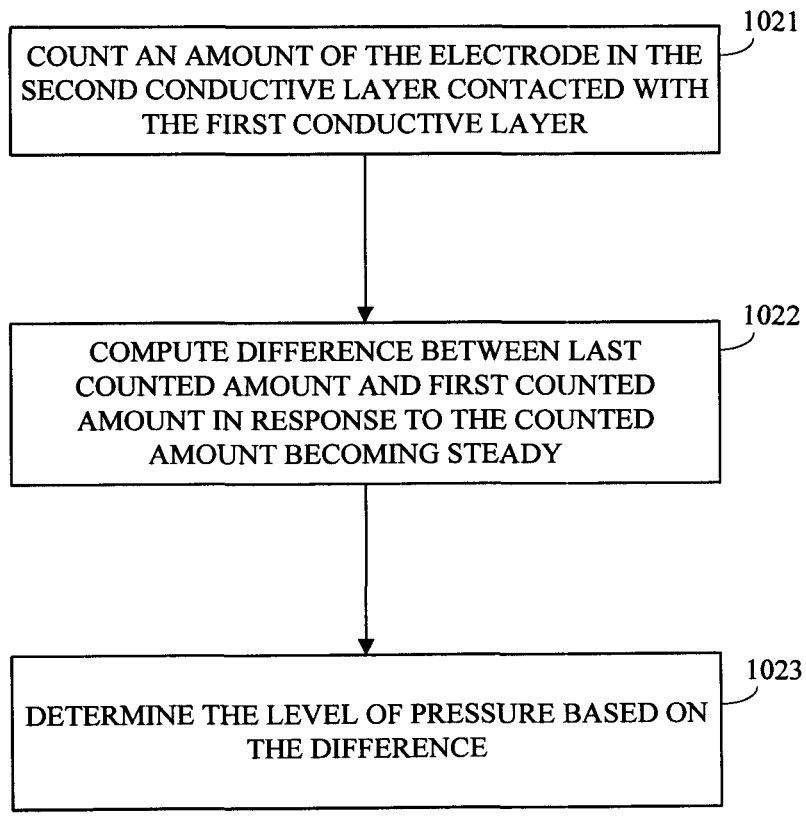
FIG. 4 is a flow diagram illustrating an exemplary process of determining the level of pressure in the touch control method of an embodiment of the present disclosure.

FIG. 4 is a flow diagram illustrating an exemplary process of determining the level of pressure by the detection module 4 (step 102). As shown in FIG. 4, in step 1021, an amount of the electrode(s) 31 in the second conductive layer 3 contacted with the first conductive layer 1 is counted, and the first counted amount is stored. Specifically, when the first conductive layer 1 is pressed and contacted the second conductive layer 3, one or more electrodes 31 in the second conductive layer 3 is contacted and electrically connected with the first conductive layer 1. The detection module 4 may count the amount of the contacted electrode(s) 31 to obtain the first counted amount. Then the detection module 4 may store the first counted amount. If the pressure pressed on the first conductive layer 1 is increased, the amount of the contacted electrodes 31 is increased, and the counted amount is increased.

Further, in step 1022, when the counted amount is no longer increased, i.e. when the counted amount becomes steady, the detection module 4 may compute the difference between the last counted amount and the first counted amount. Specifically, when the pressure is no longer increased, the amount of the contacted electrodes 31 is no longer increased, and thus the counted amount no longer changes. Then the detection module 4 may compute the difference between the last counted amount and the first counted amount.

Then in step 1023, the detection module 4 may determine the level of pressure based on the difference computed in step 1022.

In an embodiment of the present disclosure, the correspondence relationship between the level of pressure and the difference range of the counted amount may be predetermined. As such, the detection module 4 may determine the level of pressure based on the difference range within which the computed difference falls.

Figure 5:
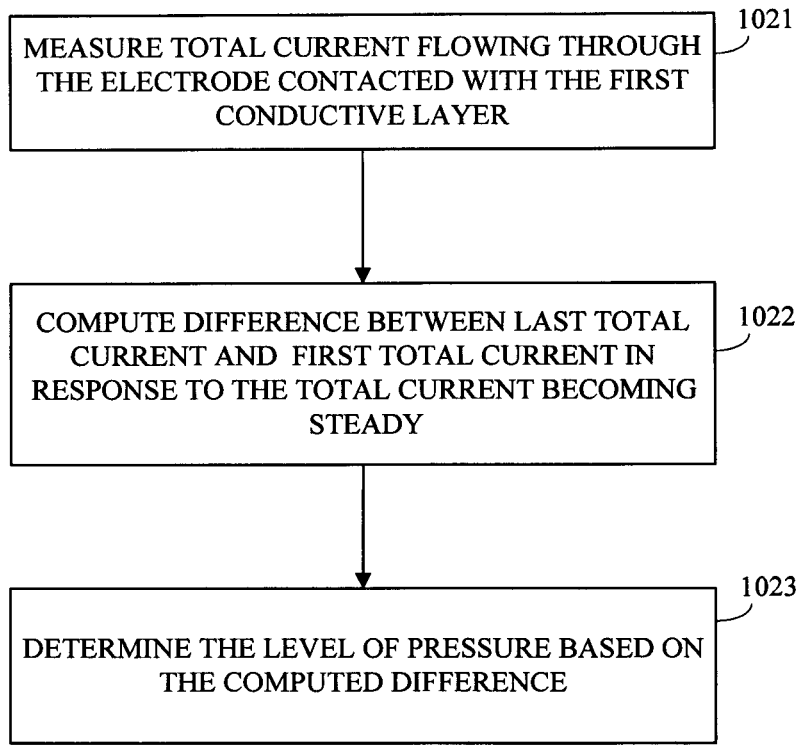
FIG. 5 is a flow diagram illustrating another exemplary process of determining the level of pressure in the touch control method of an embodiment of the present disclosure.

FIG. 5 is a flow diagram illustrating another exemplary process of determining the level of pressure by the detection module 4 (step 102). As shown in FIG. 5, in step 1021, the detection module 4 may measure the total current flowing though the electrode(s) 31 in the second conductive layer 3 contacted with the first conductive layer 1, and store the first total current. Specifically, when the first conductive layer 1 is pressed and contacted with the second conductive layer 3, one or more electrodes 31 in the second conductive layer 3 are contacted and electrically connected with the first conductive layer 1. As the contacted electrode(s) 31 may generate the current(s), the detection module 4 may measure the total current flowing though the contacted electrodes 31 and store the measured total current as the first total current. As the pressure pressed on the first conductive layer 1 is increased, the amount of the contacted electrodes 31 is increased, and thus the detection module 4 may measure the total current continuously.

Then in step 1022, the detection module 4 may compute the difference between the last total current and the stored first total current when the total current no longer changes, i.e. when the total current becomes steady. Specifically when the pressure pressed on the first conductive layer 1 is no longer increased, the measured total current is no longer increased. Then the detection module 4 may compute the difference between the last total current and the stored first total current.

Then in step 1023, the detection module 4 may determine the level of pressure pressed on the first conductive layer 1 based on the computed difference. In an embodiment of the present disclosure, the correspondence relationship between the level of pressure and the difference range of the total current may be predetermined. Therefore the detection module 4 may determine the level of pressure based on the range within which the difference falls.

In an embodiment of the present disclosure, the detection module 4 may also determine the level of pressure in real time based on the difference between the real-time measured total current and the first total current measured at the beginning of the pressing.

Figure 6:
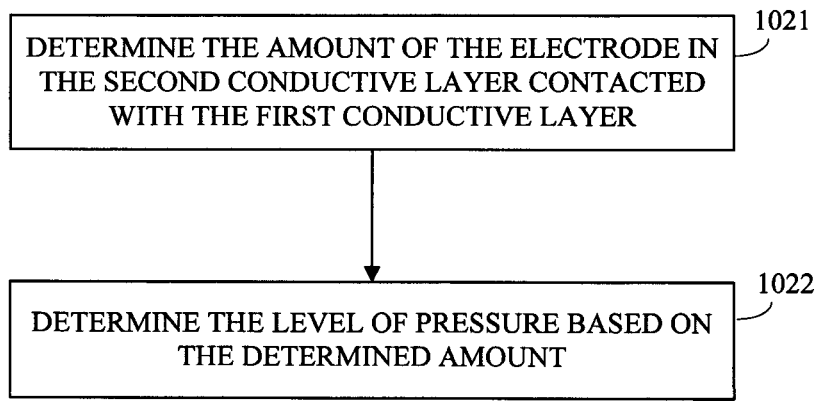
FIG. 6 is a flow diagram illustrating still another exemplary process of determining the level of pressure in the touch control method of an embodiment of the present disclosure.

FIG. 6 is a flow diagram illustrating still another exemplary process of determining the level of pressure by the detection module 4 (step 102). As shown in FIG. 6, in step 1021, the detection module 4 may determine the amount of the electrode(s) 31 in the second conductive layer 3 contacted with the first conductive layer 1. In an embodiment of the present disclosure, the detection module 4 may detect the contacted electrode(s) 31 by detecting the electrode(s) 31 which generates the current, and then determine the amount of the contacted electrode(s) 31. Then in step 1022, the detection module 4 may determine the level of pressure based on the determined amount of the contacted electrode(s) 31.

In an embodiment of the present disclosure, the correspondence relationship between the level of pressure and the amount range of the contacted electrode 31 may be predetermined. As such, the detection module 4 may determine the level of pressure based on the amount range within which the determined amount of the contacted electrodes 31 falls.

Although several embodiments of the present disclosure have been described in detail above, the scope of the present disclosure is not limited thereto. Obviously, a person skilled in the art may make various modifications and variations to the above embodiments, without departing from the scope and spirit of the present disclosure. The scope of the present disclosure is defined by the appended claims.

What is claimed is:

1. A touch control structure, comprising:
a first conductive layer;
a second conductive layer comprising a plurality of electrodes which are independent from each other;
a plurality of insulative supporting points arranged on the second conductive layer and under the first conductive layer; and
a detection module connected to the plurality of electrodes, and configured to detect an electrode in the second conductive layer contacted with the first conductive layer when the first conductive layer is pressed, and to determine a level of pressure pressed on the first conductive layer based on the detected electrode,
wherein the detection module is further configured to count an amount of the electrode in the second conductive layer contacted with the first conductive layer, to compute a first difference between a last counted amount and a first counted amount in response to the counted amount becoming steady, and to determine the level of pressure based on the first difference, the first counted amount being obtained at the beginning of the pressing, the last counted amount being obtained when the counted amount becomes steady, or
wherein the detection module is further configured to measure a total current flowing through the electrode in the second conductive layer contacted with the first conductive layer, to compute a second difference between a last total current and a first total current in response to the total current becoming steady, and to determine the level of pressure based on the second difference, the first total current being measured at the beginning of the pressing, the last total current being measured when the total current becomes steady.

2. The touch control structure according to claim 1, wherein the plurality of insulative supporting points is uniformly arranged between the first conductive layer and the second conductive layer.

3. The touch control structure according to claim 1, wherein the insulative supporting point is an elastic supporting point.

4. The touch control structure according to claim 1, wherein the first conductive layer has a continuous surface.

5. The touch control structure according to claim 1, wherein the detection module is further configured to determine an amount of the electrode in the second conductive layer contacted with the first conductive layer, and to determine the level of pressure based on the amount.

6. The touch control structure according to claim 1, wherein the detection module is further configured to supply a first voltage to the plurality of electrodes in the second conductive layer; and
wherein the first conductive layer is connected to a common voltage end or is grounded.

7. The touch control structure according to claim 1, wherein each of the plurality of electrodes is square, and wherein a side length of the square is equal to or less than 1 mm.

8. The touch control structure according to claim 1, further comprising:
a protection layer layered on the first conductive layer; and
a glass substrate on which the second conductive layer is arranged.

9. The touch control structure according to claim 1, wherein the detection module is a detection integrated circuit.

10. A display panel comprising the touch control structure according to claim 1.

11. A touch control method for the touch control structure according to claim 1, comprising:
detecting, when the first conductive layer is pressed, the electrode in the second conductive layer contacted with the first conductive layer; and
determining, based on the detected electrode, a level of pressure pressed on the first conductive layer.

12. The touch control method according to claim 11, wherein determining, based on the detected electrode, the level of pressure pressed on the first conductive layer comprises:
determining an amount of the electrode in the second conductive layer contacted with the first conductive layer; and
determining the level of pressure based on the amount.

13. The touch control method according to claim 11, wherein determining, based on the detected electrode, the level of pressure pressed on the first conductive layer comprises:
counting an amount of the electrode in the second conductive a contacted with the first conductive layer;
computing a difference between a last counted amount and a first counted amount in response to the counted amount becoming steady; and
determining the level of pressure based on the difference.

14. The touch control method according to claim 11, wherein determining, based on the detected electrode, the level of the pressure pressed on the first conductive layer comprises:
measuring a total current flowing through the electrode in the second conductive layer contacted with the first conductive layer;

computing a difference between a last to current and a first total current in response to the total current becoming steady; and determining the level of pressure based on the difference.

\* \* \* \* \*

UNITED STATES PATENT AND TRADEMARK OFFICE
CERTIFICATE OF CORRECTION

PATENT NO. : 10,275,072 B2
APPLICATION NO. : 15/228834
DATED : April 30, 2019
INVENTOR(S) : Yanling Han et al.

It is certified that error appears in the above-identified patent and that said Letters Patent is hereby corrected as shown below:

In the Claims

Claim 13, Column 12, Lines 55-56, delete "conductive a contacted" and insert therefor -- conductive layer contacted --.
Claim 14, Column 13, Line 1, delete "last to current" and insert therefor -- last total current --.

Signed and Sealed this
Ninth Day of July, 2019

Andrei Iancu
*Director of the United States Patent and Trademark Office*